Oct. 29, 1963 — R. R. RADER — 3,108,778
BLADE TYPE VALVE
Filed Jan. 16, 1961
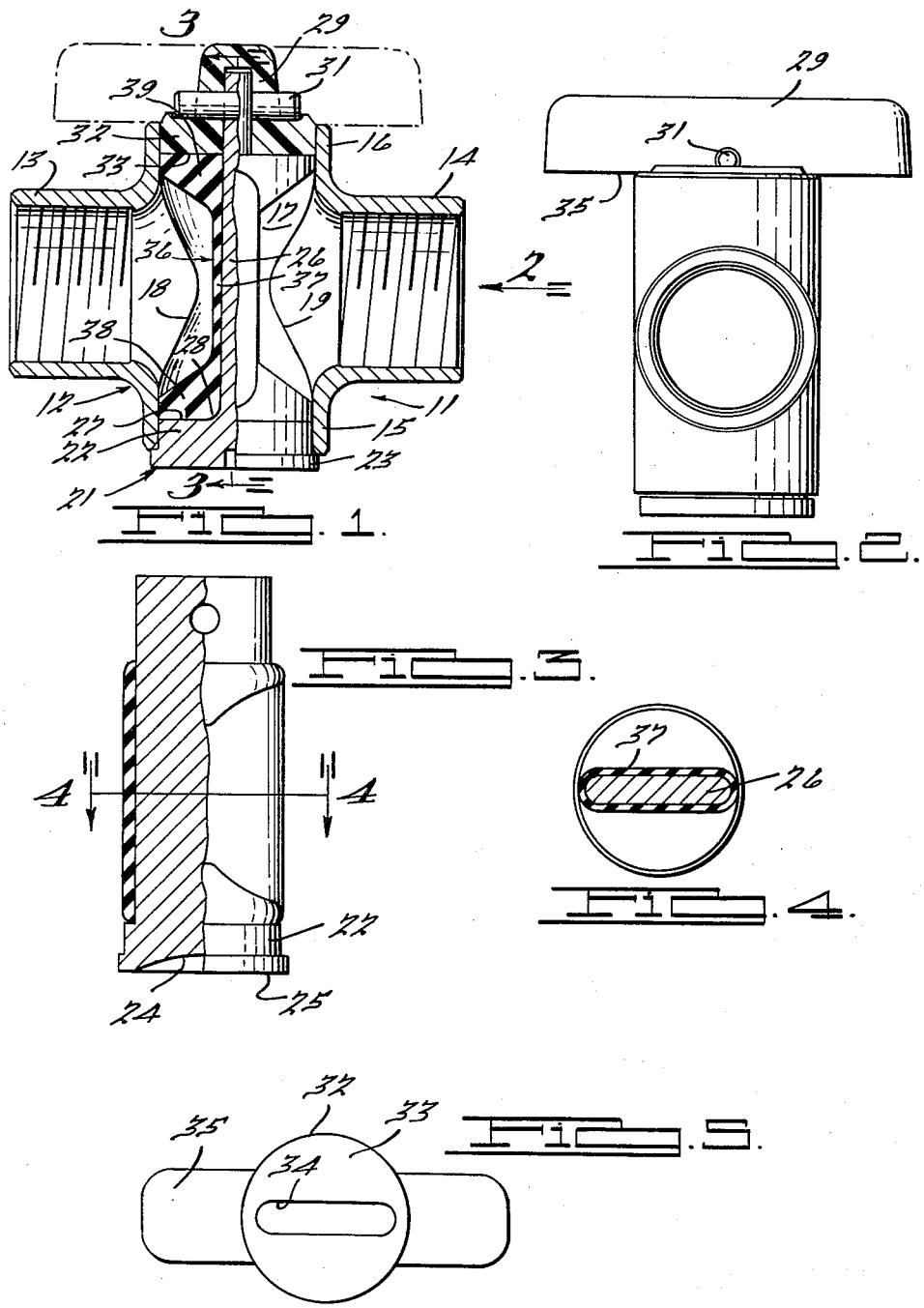
INVENTOR.
Robert R. Rader
BY
Harness, Dickey & Pierce.
ATTORNEYS.

3,108,778
BLADE TYPE VALVE
Robert R. Rader, Port Huron, Mich., assignor to Mueller Brass Co., Port Huron, Mich., a corporation of Michigan
Filed Jan. 16, 1961, Ser. No. 83,003
3 Claims. (Cl. 251—175)

This invention relates to valves, and more particularly to blade type valves which may be used to vary the amount of flow of fluid or to shut off such flow.

It is an object of the present invention to provide a novel and improved blade type valve of this nature which utilizes the sealing effect of a yieldable member mounted on the blade valve member so that the valve may be used both for shutoff and flow variation purposes.

It is another object to provide an improved valve of this type which is extremely simple and economical to construct, and is reliable in use.

Other objects and advantages of the present invention will become apparent from the following detailed description taken in conjunction with the accompanying drawings.

In the drawings:

FIGURE 1 is a side elevational view, partly in cross-section, of a valve constructed according to the present invention;

FIGURE 2 is an end view of FIGURE 1 looking in the direction of the arrow 2 of FIGURE 1;

FIGURE 3 is a cross-sectional view of the blade member and sealing member taken along the line 3—3 of FIGURE 1;

FIGURE 4 is a cross-sectional view taken along the line 4—4 of FIGURE 3 and showing the manner in which the sealing member conforms to the shape of the blade member, and FIGURE 5 is a bottom view of the handle member showing the recess for receiving the blade member.

In general terms, the illustrated embodiment of the invention comprises a body having aligned inlet and outlet ports, with tubular extensions at right angles to the ports connected to a cylindrical chamber within the body. A metal blade member extends through the chamber between these extensions and has a handle secured to one end thereof, the blade member and handle having portions rotatably mounted in the tubular extensions. An integral sealing member of rubber or similar material is mounted on and conforms to the shape of the blade, the portions of the sealing member within the tubular extensions being of circular shape and engaging the walls thereof. The shape of the sealing member is such that fluid pressure will tend to squeeze it against the cylindrical wall between the inlet and outlet ports as well as against the inner walls of the tubular extensions. The valve may thus be used both as a shutoff member and for flow variation purposes.

Referring more particularly to the drawings, the valve assembly is generally indicated at 11 and comprises a body member generally indicated at 12 having a cylindrical inlet port 13 and a cylindrical outlet port 14 in aligned relation, these portions of the housing being shown as internally threaded. A pair of aligned tubular extensions 15 and 16 extending at right angles to ports 13 and 14 are disposed between the ports, and the inner surface 17 of housing 12 between ports 13 and 14 is of cylindrical shape and of the same diameter as the internal surfaces of extensions 15 and 16. The lines designated at 18 and 19 in FIGURE 1 delineate the intersections of surface 17 with ports 13 and 14 respectively.

A blade member generally indicated at 21 is provided, this member being fabricated of metal or other appropriate rigid material and having a circular guide portion 22 rotatably mountable in the outer end of extension 15 as seen in FIGURE 1. Portion 22 has an outer flange 23 for limiting the position of blade member 21 when it is inserted in extension 15, flange 23 engaging the outer edge of this extension. A recess 24 may be provided in the outer surface 25 of guide portion 22 for the reception of a rotating tool.

Blade member 21 has a blade portion 26 extending from the flat inner surface 27 of guide portion 22, radii 28 being provided between these portions of the blade member. Blade portion 26 is of flat shape as seen in FIGURE 4 and has a width slightly less than the diameter of cylindrical surface 17. The length of blade portion 26 is somewhat greater than the distance from surface 27 of guide portion 22 to the outer end of extension 16. A handle 29 which may be fabricated of a rigid plastic material is secured to the outer end of blade portion 26 by means such as a pin 31. Handle 29 is of elongated shape as seen in FIGURES 2 and 5, and has a circular guide portion 32 of a diameter fitting within extension 16. Guide portion 32 has a flat undersurface 33 provided with an elongated recess 34 for the reception of blade portion 26, with apertures for pin 31 being provided immediately above guide portion 32. The relative dimensions of blade member 21 and handle 29 are such that when these members are assembled, with pin 31, the underside 35 of handle 29 will be held against the outer edge of extension 16, so that shifting of the assembly in the direction of the blade axis will be substantially prevented.

A sealing member generally indicated at 36 is mounted on blade member 21, this sealing member being fabricated of yieldable material such as rubber. Member 36 may be moulded in position on member 21 or may be fabricated separately and later slipped onto the blade member.

Member 36 has a central blade enclosing portion 37 of relatively thin cross-section as seen in FIGURE 4, which is shaped so as to snugly surround blade portion 26. Two end sealing portions 38 and 39 are formed at opposite ends of blade enclosing portion 37. Portions 38 and 39 are of generally conical shape as seen in FIGURE 1, with flat end surfaces engaging surface 27 of guide portion 22 and end surface 33 of handle guide portion 22. The dimensions of portions 37, 38 and 39 of member 36 are such as to tightly engage surface 17 and the inner surfaces of extensions 15 and 16 so as to create a sealing effect.

The operation of valve 11 will be apparent from the foregoing description. With blade portion 26 aligned with ports 13 and 14, free flow of fluid past the blade will be permitted. Sealing portions 38 and 39 of member 36 will prevent fluid leakage to extensions 15 and 16. When the valve is turned to the position shown in FIGURE 1, the vertically extending edges of blade enclosing portion 37 of member 36 will engage surface 17, preventing flow from port 13 to port 14. The force of fluid pressure will tend to force member 36 even more tightly against the adjacent surfaces of body 12, enhancing the sealing effect. Should it be desired to proportion the fluid flow, blade portion 26 may be set by handle 29 at any desired angle across intersections 18 and 19. The sealing effect of member 36 will of course still take place regardless of the angle of valve setting.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:

1. In a valve, a housing having inlet and outlet ports on opposite sides thereof, the interior of said housing connecting said inlet and outlet ports, a cylindrical surface on the interior of said housing extending transversely to the direction of fluid flow between said ports, a flat rigid blade disposed in said housing, a unitary sealing member of flexible material having a central blade enclosing portion of relatively thin cross-section shaped to conform to said blade, circular end sealing portions formed at opposite ends of said blade enclosing portion and extending radially outwardly therefrom, the thickness of each of said end sealing portions in the direction of extent of said blade being uninterrupted between its opposite sides, whereby fluid pressure in the housing interior will force said end sealing portions outwardly in the direction of extent of said blade, the opposite edges of said blade enclosing portion between said end sealing portions being engageable with said cylindrical surface, and circular surfaces on the interior of said housing engageable by said end sealing portions in response to said force to enhance the sealing effect thereof.

2. In a valve, a body having aligned inlet and outlet ports, a pair of tubular extensions between and extending transversely to said ports, a blade member having a circular guide portion at one end thereof rotatably mounted in one of said extensions, a blade portion of flat shape extending from said guide portion toward the other extension, a handle fixed to the outer end of said blade portion, an an integrally formed resilient sealing member having a central blade enclosing portion of thin cross section surrounding said blade portion and end sealing portions of circular shape having outer edges fitting tightly within said extensions, said end sealing portions extending radially outwardly from said blade member, the thickness of each of said end sealing portions in the direction of extent of said blade being uninterrupted between its opposite sides, whereby fluid pressure in the body interior will force said end sealing portions outwardly in the direction of extent of said blade to enhance the sealing effect thereof.

3. In a valve, a body having inlet and outlet ports on opposite sides thereof and a chamber connecting said ports, aligned tubular extensions extending from said chamber transversely to the direction of fluid flow, a blade having a flat circular guide portion at one end thereof rotatably mounted in one of said extensions and a blade portion extending through said chamber, a handle fixed to the outer end of said blade and having a flat circular guide portion fitting within the other extension, locating surfaces on said blade and handle guide portions engageable with said extensions to limit shifting of the blade in the direction of its longitudinal extent, and means carried by said blade and in sealing engagement with said chamber and said extensions, said means being responsive to fluid pressure to increase said sealing effect, said means comprising an integrally formed resilient sealing member having a central blade enclosing portion with a cross-section conforming to the shape of said blade, and a pair of end sealing portions of circular shape having conical surfaces connecting them to the blade enclosing portion and outer edges engageable with said extensions adjacent the guide portions of said blade and handle, said end sealing portions extending radially outwardly from said blade, the thickness of each of said end sealing portions in the direction of extent of said blade being uninterrupted between its opposite sides, whereby fluid pressure in the body interior will force said end sealing portions outwardly in the direction of extent of said blade to seal more firmly against said flat circular side portions and said tubular extensions.

References Cited in the file of this patent

UNITED STATES PATENTS

| 299,734 | Callahan | June 3, 1884 |
| 714,410 | Stainton | Nov. 25, 1902 |
| 2,756,961 | Pickering | July 31, 1956 |
| 2,817,489 | Hesmer | Dec. 24, 1957 |
| 2,872,944 | Ludwig | Feb. 10, 1959 |

FOREIGN PATENTS

| 112,674 | Australia | Mar. 5, 1941 |